(12) United States Patent
Lee

(10) Patent No.: US 8,553,342 B2
(45) Date of Patent: Oct. 8, 2013

(54) CAMERA MODULE WITH MEMS ACTUATOR AND METHOD FOR DRIVING THE SAME

(75) Inventor: Junghyun Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 67 days.

(21) Appl. No.: 13/167,434

(22) Filed: Jun. 23, 2011

(65) Prior Publication Data

US 2011/0317291 A1 Dec. 29, 2011

(30) Foreign Application Priority Data

Jun. 23, 2010 (KR) .................. 10-2010-0059735

(51) Int. Cl.
*G02B 7/02* (2006.01)
*G02B 26/00* (2006.01)
(52) U.S. Cl.
USPC ...................... 359/823; 359/292; 359/293
(58) Field of Classification Search
USPC ......... 359/813, 814, 823, 824, 248, 290–295; 356/139.05, 326, 477; 700/110, 121; 438/17, 438/18; 385/14–18
See application file for complete search history.

(56) References Cited

U.S. PATENT DOCUMENTS

| | | | |
|---|---|---|---|
| 6,567,715 B1 * | 5/2003 | Sinclair et al. | ................ 700/110 |
| 6,636,653 B2 * | 10/2003 | Miracky et al. | ................. 385/14 |
| 7,158,281 B2 * | 1/2007 | Chen et al. | .................... 359/291 |
| 8,203,702 B1 * | 6/2012 | Kane et al. | ............... 356/139.05 |

* cited by examiner

*Primary Examiner* — Loha Ben
(74) *Attorney, Agent, or Firm* — Saliwanchik, Lloyd & Eisenschenk

(57) ABSTRACT

Disclosed herein is a camera module having a MEMS actuator and a driving method thereof, the camera module with a MEMS actuator, including, a MEMS actuator moving a lens with electrostatic force, for focus adjustment, an electrostatic capacity measurement unit measuring electrostatic capacity produced in the MEMS actuator, a foreign substance determination unit determining if foreign substances exist in the MEMS actuator, and outputting a trigger signal when a foreign substance exists, and a MEMS actuator drive unit driving the MEMS actuator to a reiterated vibration using the trigger signal outputted from the foreign substance determination unit.

11 Claims, 6 Drawing Sheets

CAMERA MODULE WITH MEMS ACTUATOR AND METHOD FOR DRIVING THE SAME

CROSS-REFERENCE TO RELATED APPLICATION

This application claims the benefit under 35 U.S.C. §119 of Korean Patent Application No. 10-2010-0059735, filed on Jun. 23, 2010, which is hereby incorporated by reference in its entirety.

BACKGROUND OF THE DISCLOSURE

1. Field of the Invention

The present invention relates to a camera module having a MEMS actuator and a driving method thereof.

2. Description of the Related Art

As the spread of various mobile terminals is widely generalized, and requirements of consumers related to mobile terminals are diversified with the commercialization of a wireless internet service, thus various kinds of accessories are mounted on such mobile phones.

Among other things, a camera module photographs subjects as a picture or a moving image, stores an image data thereof, and edits and transfers the same when needed.

Meanwhile, in the camera, a focal point of a lens changes according to a distance between the lens and a subject.

Therefore, a camera, for an image photographing of superior quality, demands a function of automatically adjusting a focus according to a distance change with the subject, that is, an Auto Focus (AF) function.

BRIEF SUMMARY

The present invention provides a camera module with a MEMS actuator, including a MEMS (Micro Electro Mechanical Systems) actuator moving a lens with electrostatic force, for focus adjustment; an electrostatic capacity measurement unit measuring electrostatic capacity produced in the MEMS actuator; a foreign substance determination unit determining if foreign substances exist in the MEMS actuator, and outputting a trigger signal when a foreign substance exists; and a MEMS actuator drive unit driving the MEMS actuator to a reiterated vibration using the trigger signal outputted from the foreign substance determination unit.

The MEMS actuator may be constructed that a lens mounting stage safely received with a lens is connected with a first connection unit by means of a first hinge, wherein the first connection unit is connected with a second connection unit fixed with a second hinge, the first connection unit is connected to a fixed spring.

The MEMS actuator may be installed with a housing for a foreign substance permeation prevention and protection from outside.

An inner housing bottom surface, an upper surface and one of the both parts may be formed with an adhesive capable of sticking the foreign substance.

The MEMS actuator may include a comb drive part having electrodes arranged in a comb form to generate an electrostatic force for adjusting a focus of the lens.

The foreign substance determination unit may be a determination unit calculating a difference between a forward electrostatic capacity and a backward electrostatic capacity of a hysteresis corresponding to a given range of a voltage applied to the MEMS actuator, and determining in a case a maximum difference of differences between the calculated forward electrostatic capacity and backward electrostatic capacity is more than a critical value, as foreign substances existing inside the MEMS actuator.

The foreign substance determination unit may be determination unit calculating a difference of electrostatic capacity corresponding to voltages applied N times to the MEMS actuator, and determining when a maximum difference of the calculated difference is more than a critical value, as foreign substances existing inside the MEMS actuator.

The present invention provides a method for driving a camera module with MEMS actuator, the method including measuring electrostatic capacity produced when adjusting a focus of a lens with an electrostatic force in a MEMS actuator; determining if electrostatic capacity generated in the MEMS actuator has an error; and driving the MEMS actuator to a reiterated vibration in a case the electrostatic capacity has an error, and removing foreign substances existing at the inner part of the MEMS actuator.

The step of determining if electrostatic capacity generated in the MEMS actuator has an error may be a step of calculating a difference between a forward electrostatic capacity and a backward electrostatic capacity of a hysteresis corresponding to a given range of a voltage applied to the MEMS actuator, and determining in a case a maximum difference of differences between the calculated forward electrostatic capacity and backward electrostatic capacity is more than a critical value, as foreign substances existing inside the MEMS actuator.

The step of determining if electrostatic capacity generated in the MEMS actuator has an error may be a step of calculating a difference of electrostatic capacity corresponding to voltages applied N times to the MEMS actuator, and determining when a maximum difference of the calculated difference is more than a critical value, as foreign substances existing inside the MEMS actuator.

An inner housing bottom surface, an upper surface and one of the both parts of the MEMS actuator may be formed with an adhesive, and the step of driving the MEMS actuator to a reiterated vibration, and removing foreign substances existing at the inner part of the MEMS actuator may be a step of driving the MEMS actuator to a reiterated vibration and sticking foreign substances existing inside the MEMS actuator to the adhesive for removal.

In an advantageous effect, a camera module provided with a MEMS actuator of the present invention can sense an existence of foreign substances inside a MEMS actuator with occurring at the time of the MEMS actuator configured to perform a focus adjustment by moving a lens with an electrostatic force, thereby remove foreign substances efficiently by driving a MEMS actuator to a reiterated vibration.

Further, the present invention has an advantageous effect of forming an adhesive into a housing of a MEMS actuator and driving the MEMS actuator in a repetitive vibration way, thereby easily capturing foreign substances departing from an originally existing position.

DETAILED DESCRIPTION

Hereinafter, described is an embodiment of the present invention in reference to the annexed drawings.

Figure 1:
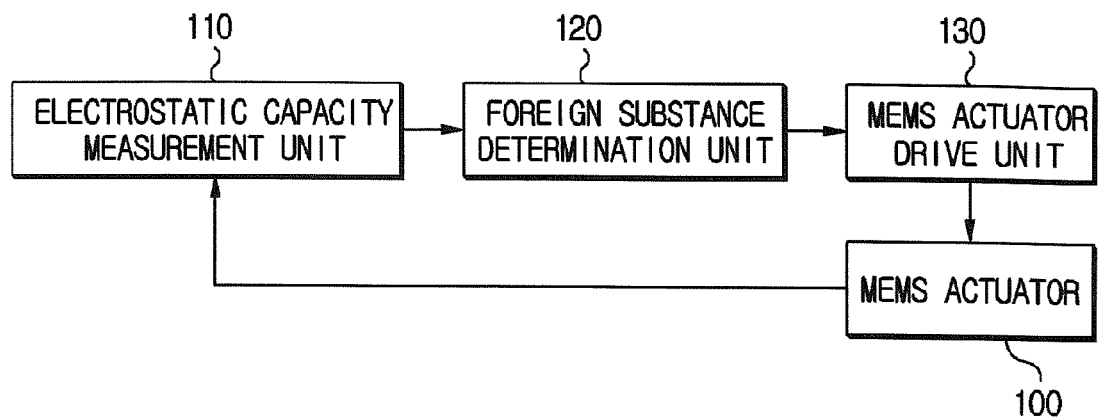
FIG. 1 is a schematic block diagram of a camera module having a MEMS actuator according to the present invention.

FIG. 1 is a schematic construction block diagram of a camera module having a MEMS actuator according to the present invention.

A camera module of the present invention is provided with a MEMS actuator, wherein a MEMS actuator is driven for a focus adjustment of lenses such that the lens moves upwardly/downwardly.

A camera module of such a MEMS actuator with its construction includes a MEMS actuator 100 moving a lens with electrostatic force for focus adjustment; an electrostatic capacity measurement unit 110 measuring electrostatic capacity producing from the MEMS actuator 100; an electrostatic capacity measurement unit 110 measured from the electrostatic capacity measurement unit 110; a foreign substance determination unit 120 determining if foreign substances exist in the MEMS actuator 100 based on the change of electrostatic capacity measured at the electrostatic capacity measurement unit 110, and outputting a trigger signal if a foreign substance exists; and a MEMS actuator drive unit 130 driving the MEMS actuator 100 to a reiterated vibration by the trigger signal output from the foreign substance determination unit 120.

Herein, the MEMS based actuator drive unit 130 may be defined as a drive unit adjusting a voltage for driving the MEMS actuator 100, and especially controls a movement of the lens by adjusting the voltage.

Thus, a camera module mounted with a MEMS actuator has the MEMS actuator 100 performing a focus adjustment by moving a lens with electrostatic force, and it functions to sense an existence of foreign substances produced by a drive of the MS actuator 100, and then remove foreign substances by driving the MEMS actuator 100 to a reiterated vibration the MEMS actuator 100.

More specifically, the MEMS actuator 100 produces electrostatic capacity when moving a lens upwardly/downwardly with electrostatic force by which a focus is adjusted, and the electrostatic capacity originated from the MEMS actuator 100 may be measured at the electrostatic measurement unit 110.

Herein, the electrostatic measurement unit 110, when the MEMS actuator 100 moves a lens, may receive electrostatic capacitance through a feedback in real time.

Thereafter, the foreign substance determination unit 120 determines if foreign substances exist within the MEMS actuator 100 by the change of electrostatic capacity measured at the electrostatic measurement unit 110, and when a foreign substance exists, outputs a trigger signal to the MEMS actuator drive unit 130 and drives the MEMS actuator 100 to a reiterated vibration.

On the one hand, existing within the MEMS actuator 100, the foreign substance decreases an electrostatic force and inhibits a reproducible focus adjustment, thereby lowering a trait of a camera module.

Therefore, when the MEMS actuator 100 is repetitively vibrated, foreign substances existing inside the MEMS actuator 100 can break away according to its construction.

Herein, the MEMS actuator 100 may be designed to be capable of doing a motion of straight line, and at this time, the reiterated vibration drive may be defined as a reciprocating motion.

That is, a straight line motion of the MEMS actuator enables a lens's movement and thus capable of performing a focus adjustment.

Figure 2A:
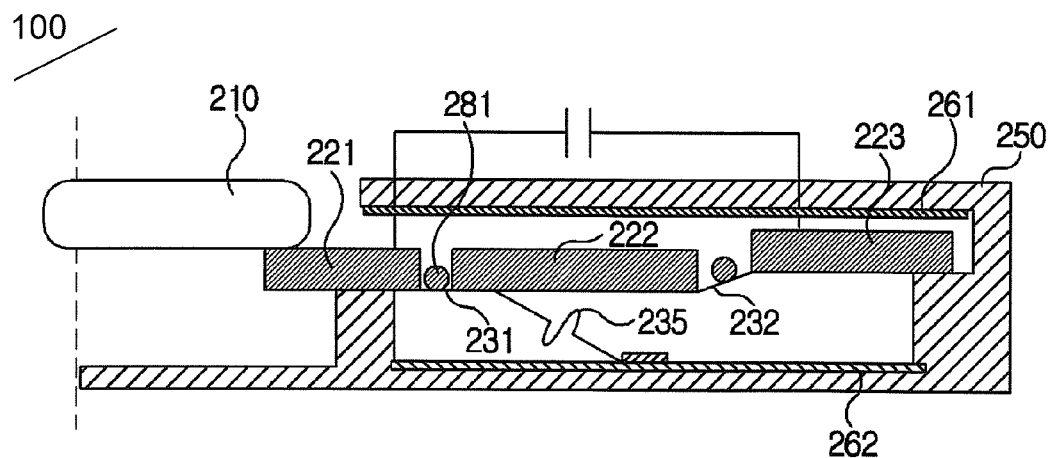
FIGS. 2a and 2b are conceptional construction cross-section views for a partial construction of one example of a MEMS actuator applied according to the present invention.
Figure 2B:
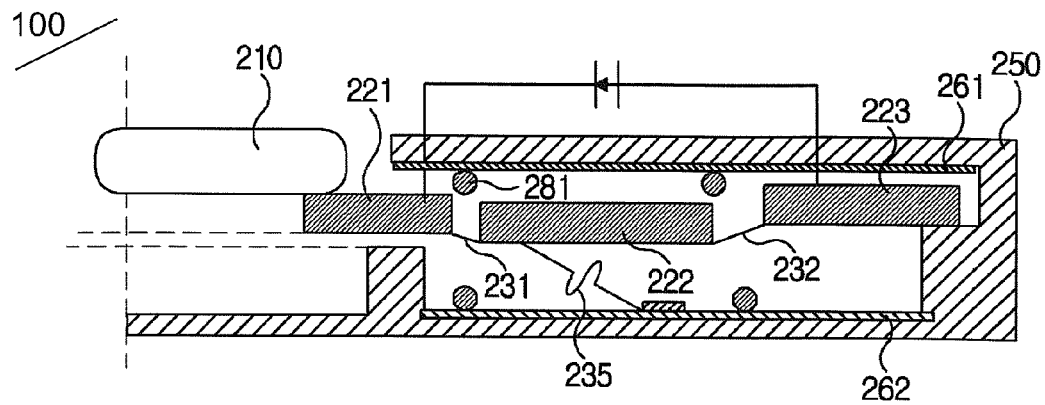

FIGS. 2a and 2b are conceptual construction cross-section diagrams for describing a partial construction of one example of a MEMS actuator applied according to the present invention.

A MEMS actuator applied according to the present invention may be realized to include constructions, for example, in which a lens mounting stage 221 safely received with a lens 210 is connected to a first connection unit 222 by means of a first hinge 231, the first connection unit 222 is connected to a second connection unit 223 fixed with a second hinge 232 and the first connection unit 222 is connected to a fixed spring 235.

By reference, the first and second connection units 222, 223, the first and second hinges 231, 232 and the spring 235, components raising the lens mounting stage 221 by such electrostatic force, is symmetrically formed centered on the lens mounting stage 221, thus pushing up the lens mounting stage 221 and raising the lens 210.

Operations related to such a drive and a disposition of components may be unrestrictedly designed, but not limited to drawings and the description of the invention.

And, a MEMS actuator is installed with a housing 250 for an outback foreign substance permeation prevention and a protection of inner components, and the inner part of this housing, referring to FIGS. 2a and 2b, is formed with first and second hinges 231, 232, first and second connection units 222, 223 and a spring 235.

Herein, when foreign substances 281 exist inside the MEMS actuator, an error occurs to an action of the MEMS actuator.

That is, like FIG. 2a, in a case where first and second hinges 231, 232 are attached with a foreign substance 281, on account of a force raising the lens mounting stage 221 not in proportion to electrostatic force, an error on a drive occurs.

Thus, a MEMS actuator applied according to the invention is preferably formed with adhesives 261, 262, by which foreign substances 281 can adhere to one of an inner housing bottom surface, an inner housing upper surface andboth the inner housing bottom surface and the inner housing upper surface for an external foreign substance permeation prevention and a protection of inner components.

Herein, the adhesives 261, 262 preferably have a film shape.

This is, as described above, because of a reiterated vibration drive of a MEMS actuator, foreign substances 281 move away from originally existed positions as shown in FIG. 2a, and then can stick to the adhesives 261, 262 as illustrated in FIG. 2b.

Thus, the present invention has a good point of forming an adhesive onto the housing 250 of the MEMS actuator, and by a repetitive vibrational drive of the MEMS actuator, easily capturing foreign substances separating away from an originally existed place.

Figure 3:
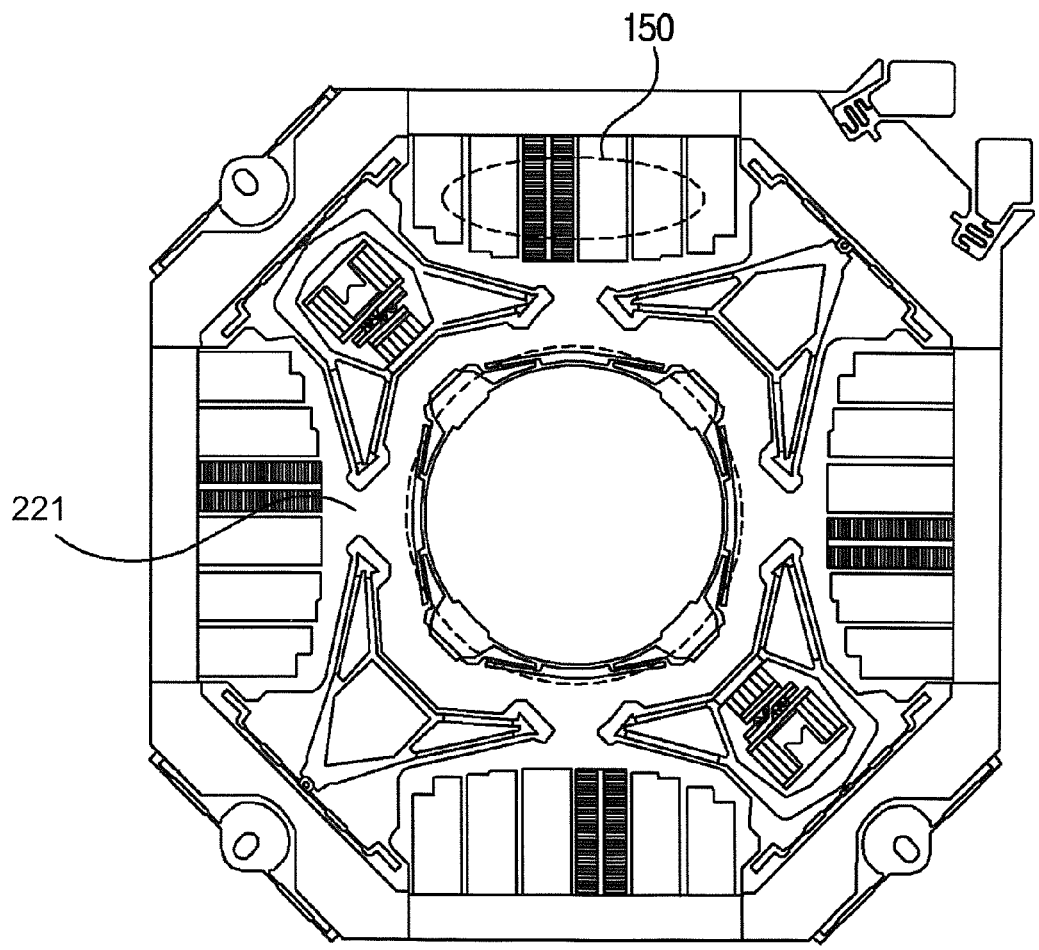
FIG. 3 is a top view for describing a schematic construction of another example of a MEMS actuator applied according to the present invention.
Figure 4:
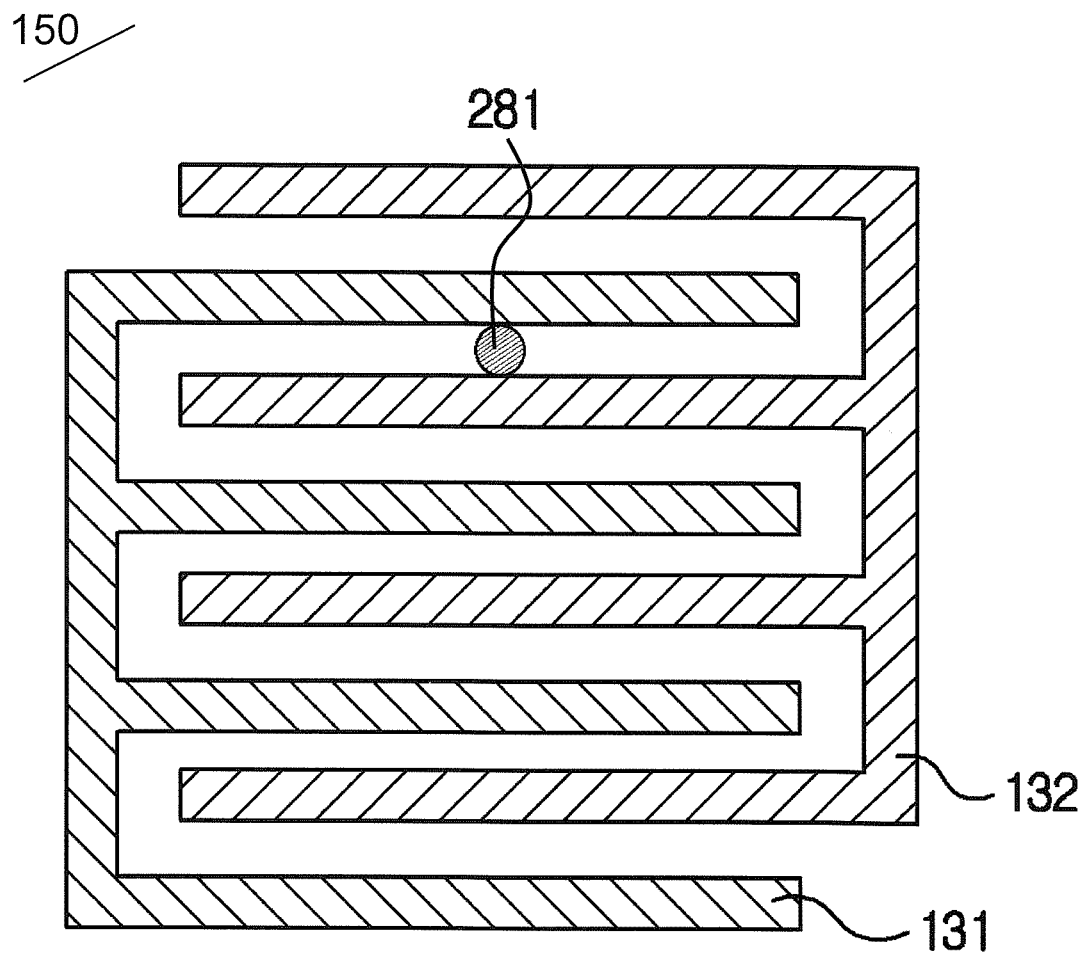
FIG. 4 is a conceptual diagram for describing an operation of a MEMS comb actuator applied according to the present invention.

FIG. 3 is a top view for describing a schematic construction of another example of a MEMS actuator applied according to the present invention, and FIG. 4 is a conceptual diagram for describing an operation of a MEMS comb actuator applied according to the present invention.

A MEMS actuator may include a comb drive unit 150 having comb-shaped arranged electrodes as a drive part for producing electrostatic force adjusting a focus of a lens.

At this time, as shown in FIG. 3, the comb drive part 150 is installed at the surrounding of a lens mounting stage 221, configured to push up the lens mounting stage 221 using an electrostatic force and raise a lens (not shown) posed on the lens mounting stage 221.

At this time, the comb drive unit 150, as shown in FIG. 4, is comprised of a stationary comb electrode 131 and a moveable comb electrode 132 arranged in a comb form, wherein a voltage is applied between the stationary comb electrode 131 and the moveable comb electrode 132, so that the moveable comb electrode 132 shifts to a direction of the stationary comb electrode 131.

The moveable comb electrode 132's moving force can raise or lower the lens for adjusting a focus.

For example, the stationary comb electrode 131 is connected to a fixed flat-plate structure (not shown), and the moveable comb electrode 132 is linked to a moveable flat-plate structure (not shown), by which the moveable comb electrode 132 shifts the moveable flat-plate structure, and the moveable flat-plate structure can raise or lower the lens mounting stage 221 and thus adjust a focal point of a lens.

At this time, in a travel of the lens mounting stage, a drive displacement is determined based on an electrostatic capacity gap between the stationary comb electrode 131 and the moveable comb electrode 132.

Herein, as shown in FIG. 4, when the stationary comb electrode 131 and the moveable comb electrode 132 have foreign substances 281, reliability on focus adjustment of the lens is lowered due to an electrostatic capacity difference.

Thus, by producing a vibration with a repetitive motion from the moveable comb electrode 132 toward the stationary comb electrode 131 and reverting to an initial state, the foreign substances 281 may break away.

Figure 5:
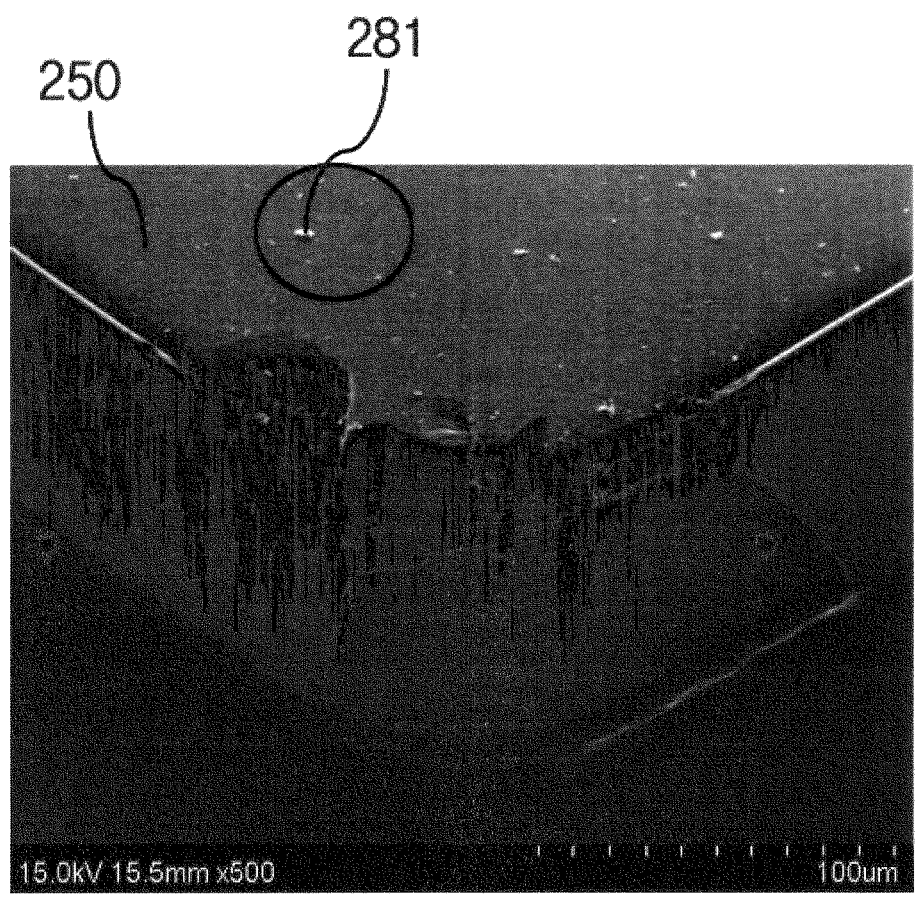
FIG. 5 is a photograph for describing foreign substances existing inside a MEMS actuator according to the present invention.

FIG. 5 is a photograph for describing foreign substances existing in a MEMS actuator according to the present invention.

In relation a MEMS actuator does a motion for adjusting a focus of a lens, components of the MEMS actuator create a crack, causing a destruction of a structure, so that a minute foreign substance in micro unit can break away from the components.

That is, like a photograph diagram of FIG. 5, components 250 of the MEMS actuator exist with a great deal of foreign substances 281.

In particular, a housing of the MEMS actuator is coated with composite material, and the substance formed of silicone, so that a drive of the MEMS actuator can cause minute destruction areas, and foreign substances separated from the destruction area may pose on a principal portion of the MEMS actuator, producing an error on an operation.

Figure 6:
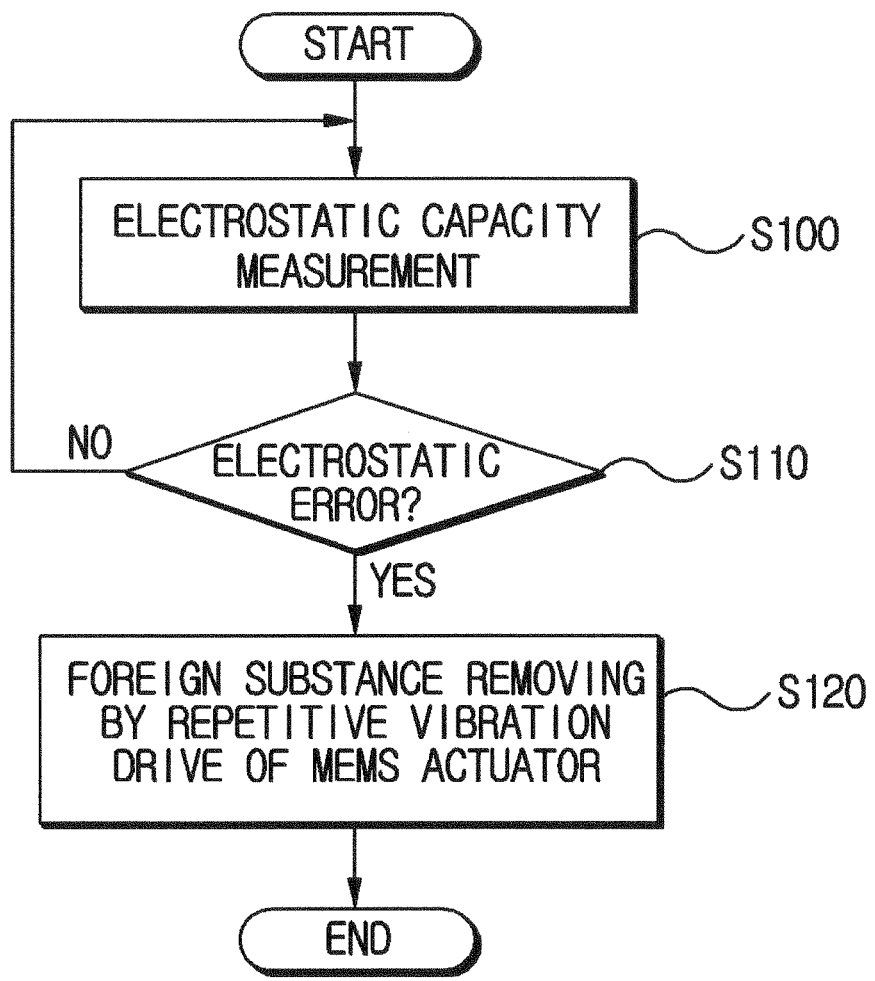
FIG. 6 is a schematic flowchart of a drive method of a camera module having a MEMS actuator according to the present invention.

FIG. 6 is a schematic flow chart of a drive method of a camera module with a MEMS actuator according to the invention.

A drive method of a camera module having a MEMS actuator, first measures electrostatic capacitance produced when the MEMS actuator adjusts a focus of a lens by electrostatic force. (the step of S100)

The next, it is determined that electrostatic capacity occurred at the MEMS actuator has an error. (the step of S110)

Succeedingly, if the electrostatic capacity has an error, the MEMS actuator may be driven in a repetitive vibrating fashion, foreign substances existing in the MEMS actuator being removed. (the step of S120)

Figure 7:
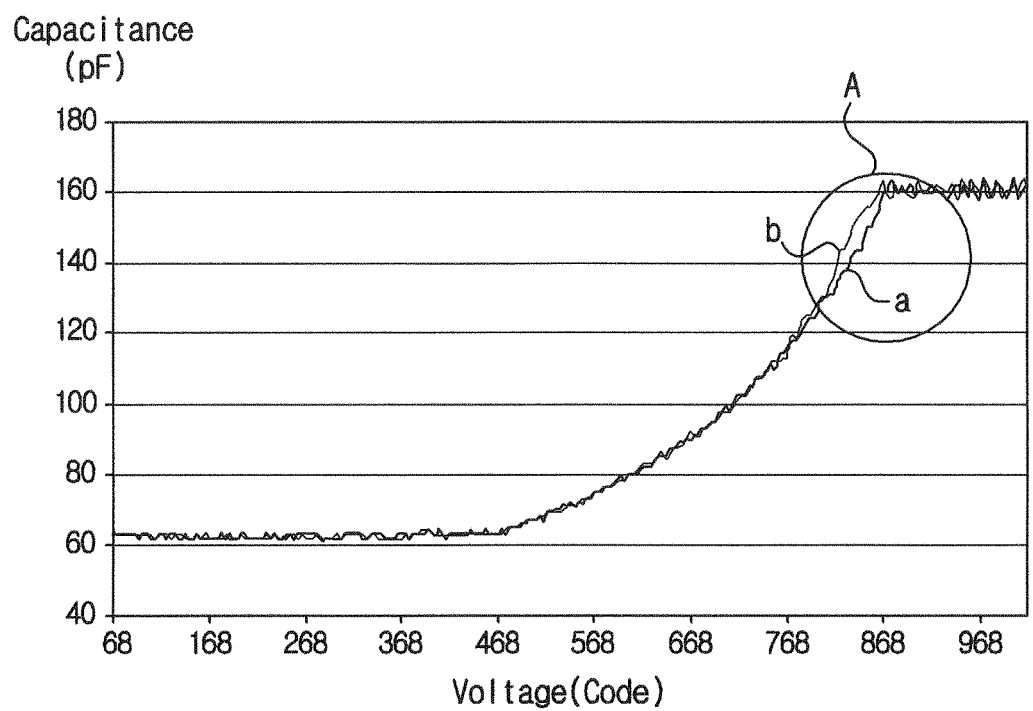
FIG. 7 is a graph for describing the detection of a hysteresis error at electrostatic capacity producing from a MEMS actuator according to the present invention.
Figure 8:
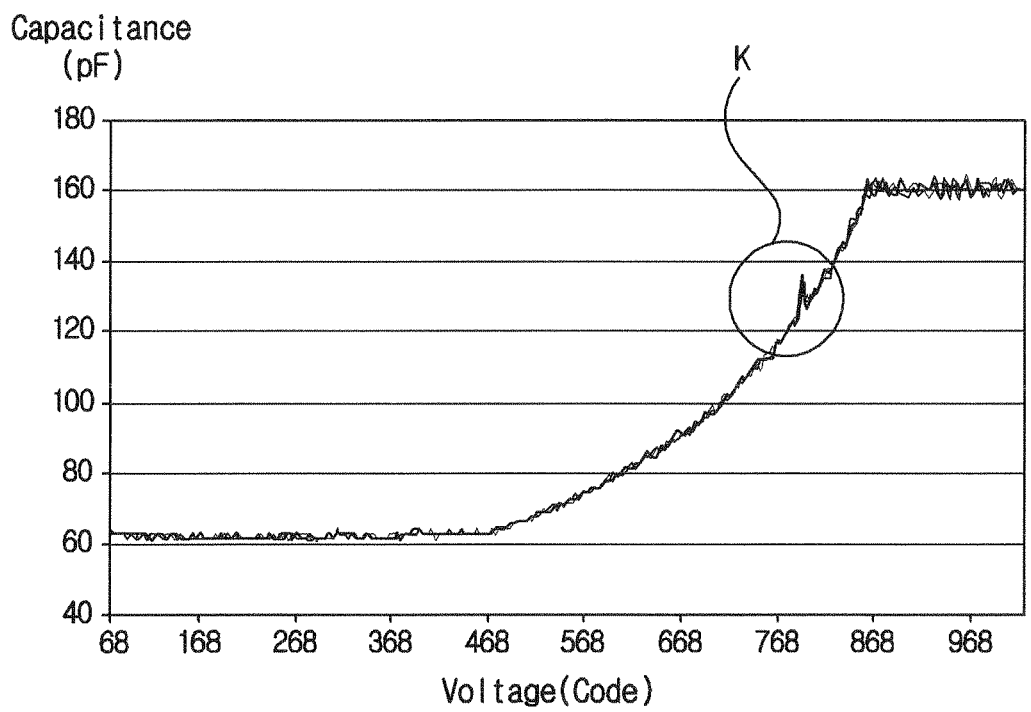
FIG. 8 is a graph for describing the detection of a repeatable error at electrostatic capacity producing from a MEMS actuator of the present invention.

FIG. 7 is a graph for describing an detection of hysteresis error at electrostatic capacity that is produced at a MEMS actuator according to the present invention, and FIG. 8 is a graph for describing that a repeatability error at electrostatic capacity that is produced at a MEMS actuator according to the invention is detected.

FIGS. 7 and 8 are graphs relating to electrostatic capacity and voltages produced at a MEMS actuator, in which FIG. 7 calculates a difference between a forward electrostatic capacity and a backward electrostatic capacity of a hysteresis corresponding to a certain range of voltages (from Voffset to Vmax) applied to a MEMS actuator, and then determines a case a maximum difference of differences between the calculated forward electrostatic capacity and backward electrostatic capacity is over a critical value (an occurrence of hysteresis error), as foreign substances existing at the MEMS actuator inner part.

That is, looking into FIG. 7, in 'A' area, a difference between a forward electrostatic capacity (a) and a backward electrostatic capacity (b) is to be the maximum.

And, FIG. 8 is one to apply a certain range of voltages (from Voffset to Vmax) by N times to a MEMS actuator, calculate a difference of electrostatic capacity corresponding to the N-times applied voltage, and in a case a maximal difference among the calculated differences is more than a critical value (an occurrence of repeatable error), determines that foreign substances exist within the MEMS actuator.

That is, in FIG. 8, 'K.' area existing with a peak is an area where a difference of electrostatic capacity occurs.

Herein, an N-times application of voltages to the MEMS actuator needs to be performed at least 2 times.

Therefore, regarding a determination that foreign substances inside the MEMS actuator exist by the change of electrostatic capacity at a foreign-substance determination unit of FIG. 1 and a determination that electrostatic capacity produced at a MEMS actuator of '110 step' of FIG. 6 has an error, it is preferable to determine an occurrence of the above-described hysteresis error or a taken-place of a reiterated error, thereby discriminating that foreign substances exist inside the MEMS actuator.

While the present invention has been described in detail through representative embodiments in the above part, it would be understood by those skilled in the art that various modifications and variations can be made within a spirit and a scope of the invention, and they belong to the annexed claims.

What is claimed is:

1. A camera module with a MEMS (Micro Electro Mechanical Systems) actuator, comprising:
   a MEMS actuator moving a lens with electrostatic force, for focus adjustment;
   an electrostatic capacity measurement unit measuring electrostatic capacity produced in the MEMS actuator;
   a foreign substance determination unit determining if foreign substances exist in the MEMS actuator, and outputting a trigger signal when a foreign substance exists; and a MEMS actuator drive unit driving the MEMS actuator to a reiterated vibration using the trigger signal outputted from the foreign substance determination unit.

2. The camera module as claimed in claim 1, wherein the MEMS actuator is constructed such that a lens mounting stage safely received with a lens is connected with a first connection unit by a first hinge, wherein the first connection unit is connected with a second connection unit fixed with a second hinge, the first connection unit is connected to a fixed spring.

3. The camera module as claimed in claim 1, wherein the MEMS actuator is installed with a housing for a foreign substance permeation prevention and protection from outside.

4. The camera module as claimed in claim 3, wherein one of an inner housing bottom surface, an inner housing upper surface, and both the inner housing bottom surface and the inner housing upper surface are formed with an adhesive capable of sticking the foreign substance.

5. The camera module as claimed in claim 1, wherein the MEMS actuator includes a comb drive part having electrodes arranged in a comb form to generate an electrostatic force for adjusting a focus of the lens.

6. The camera module as claimed in claim 1, wherein the foreign substance determination unit is a determination unit calculating a difference between a forward electrostatic capacity and a backward electrostatic capacity of a hysteresis corresponding to a given range of a voltage applied to the MEMS actuator, and determining in a case where a maximum difference of differences between the calculated forward electrostatic capacity and backward electrostatic capacity is more than a critical value, as foreign substances existing exist inside the MEMS actuator.

7. The camera module as claimed in claim 1, wherein the foreign substance determination unit is the determination unit calculating differences between electrostatic capacities corresponding to voltages applied N times to the MEMS actuator, and determining when a maximum difference of the calculated differences is more than a critical value, as foreign substances exist inside the MEMS actuator.

8. A method for driving a camera module with a MEMS actuator, comprising:
measuring electrostatic capacity produced when adjusting a focus of a lens with an electrostatic force in a MEMS actuator;
determining if electrostatic capacity generated in the MEMS actuator has a hysteresis error; and
driving the MEMS actuator to a reiterated vibration in a case where the electrostatic capacity has the hysteresis error, and removing foreign substances existing inside the MEMS actuator.

9. The method as claimed in claim 8, wherein the step of determining if electrostatic capacity generated in the MEMS actuator has an error is a step of calculating a difference between a forward electrostatic capacity and a backward electrostatic capacity of a hysteresis corresponding to a given range of a voltage applied to the MEMS actuator, and determining in a case where a maximum difference of differences between the calculated forward electrostatic capacity and backward electrostatic capacity is more than a critical value, as foreign substances exist inside the MEMS actuator.

10. The method as claimed in claim 8, wherein the step of determining if electrostatic capacity generated in the MEMS actuator has a hysteresis error is a step of calculating differences between electrostatic capacity capacities corresponding to voltages applied N times to the MEMS actuator, and determining when a maximum difference of the calculated differences is more than a critical value, as foreign substances exist inside the MEMS actuator.

11. The method as claimed in claim 8, wherein one of an inner housing bottom surface, a hysteresis inner housing upper surface, and both the inner housing bottom surface and the inner housing upper surface of the MEMS actuator are formed with an adhesive, and
the step of driving the MEMS actuator to a reiterated vibration, and removing foreign substances existing inside the MEMS actuator is a step of driving the MEMS actuator to a reiterated vibration and sticking foreign substances existing inside the MEMS actuator to the adhesive.

* * * * *

UNITED STATES PATENT AND TRADEMARK OFFICE
CERTIFICATE OF CORRECTION

| | | |
|---|---|---|
| PATENT NO. | : 8,553,342 B2 | Page 1 of 1 |
| APPLICATION NO. | : 13/167434 | |
| DATED | : October 8, 2013 | |
| INVENTOR(S) | : Junghyun Lee | |

It is certified that error appears in the above-identified patent and that said Letters Patent is hereby corrected as shown below:

In the Claims

In column 7, line 32, delete the word "existing"

In column 8, line 30, delete the words "a hysteresis"

In column 8, lines 30-31, change the words "inner housing upper surface" to --an inner housing upper surface--

Signed and Sealed this
Twenty-fifth Day of November, 2014

Michelle K. Lee
*Deputy Director of the United States Patent and Trademark Office*